United States Patent [19]

Motte

[11] Patent Number: 5,177,119
[45] Date of Patent: Jan. 5, 1993

[54] POLYURETHANE FOAMS BLOWN ONLY WITH WATER

[75] Inventor: Philippe C. Motte, Media, Pa.

[73] Assignee: ARCO Chemical Technology, L.P., Wilmington, Del.

[21] Appl. No.: 514,623

[22] Filed: Apr. 25, 1990

[51] Int. Cl.$^5$ .............................. C08G 18/00
[52] U.S. Cl. ....................... 121/175; 521/170; 521/174; 521/159; 521/160
[58] Field of Search ........... 521/159, 160, 163, 165, 521/170, 174, 175

[56] References Cited

U.S. PATENT DOCUMENTS

| | | | |
|---|---|---|---|
| 3,803,064 | 4/1974 | Fishbein et al. | 521/167 |
| 3,857,800 | 12/1974 | Fishbein et al. | 521/174 |
| 3,943,075 | 3/1976 | Fishbein et al. | 528/48 |
| 4,100,116 | 7/1978 | Mazanek et al. | 521/167 |
| 4,256,846 | 3/1981 | Ohashi et al. | 521/117 |
| 4,259,452 | 3/1981 | Yutuka et al. | 521/52 |
| 4,910,231 | 3/1990 | Pham et al. | 521/159 |

FOREIGN PATENT DOCUMENTS 2095362  2/1972  France.

*Primary Examiner*—John Kight, III
*Assistant Examiner*—Duc Truong
*Attorney, Agent, or Firm*—David H. Mossman; Dennis M. Kozak

[57] ABSTRACT

A novel polyurethane resin foam composition is provided which is only water-blown and requires no chlorofluorocarbon or other auxiliary blowing agents, yet suffers little or no degradation in physical properties even at reduced isocyanate indexes. The formulation includes a relatively low molecular weight polyethylene glycol along with the conventional polyol to make a blend for the polyol component. The molecular weight range of the polyethylene glycol is from about 200 to about 600. The lower molecular weight polyethylene glycol may range from about 2 to about 10 parts by weight of the polyol, based on the total polyurethane foam composition.

32 Claims, No Drawings

POLYURETHANE FOAMS BLOWN ONLY WITH WATER

FIELD OF THE INVENTION

The invention relates to the synthesis of polyurethane compositions and methods for making the same, and in one aspect, is more particularly related to polyurethane compositions that are blown only with water using no halocarbon blowing agents.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Polyurethane foams are also used as sponges and for other uses that require liquid absorption properties, such as specialty packaging and personal care and hygiene items.

Polyurethane foam formulations typically require a blowing agent to generate the gas to fill or expand the polyurethane foam cells. The resultant density of a polyurethane foam is controlled by the quantity and efficiency of the blowing agents. While carbon dioxide may be generated as a blowing agent through the reaction of water with the isocyanate, the use of low-boiling inert liquids, in particular chlorofluorocarbons (CFCs), to augment or replace the chemical blowing action has lead to certain property advantages in the final foams, such as low thermal conductivity characteristic of the trapped CFCs.

However, the CFCs used as blowing agents, and for other purposes, are now suspected to be linked to the depletion of ozone in the upper atmosphere where the generally inert CFCs are decomposed by ultraviolet light. To avoid this potential problem, polyurethane foams blown only with carbon dioxide have acquired renewed interest.

The use of carbon dioxide generated from the reaction of water with isocyanate as a sole blowing agent, necessitates formulations containing relatively large amounts of water to obtain low density foam grades, i.e., 5 parts by weight (pbw) water for 1.2 pounds per cubic foot (pcf) density. When the water content exceeds a certain level, about 5.4 pbw, the foams become more difficult to process because of the increased exothermic conditions and resulting threat of scorching and fire.

In addition the major parameters regulating flexible polyurethane foam hardness are the hard segment/soft segment ratio and their distribution in the polymer chain. When water is used as a blowing agent, each part of water added to the foam formulation produces 8.2 parts of high density aromatic hard segment (the polyurea portion). At water levels above 4 parts, this hard segment increase becomes a significant percentage that overpowers the softening characteristics of the standard polyols.

Many attempts have been made to counterbalance the negative influence of the excess urea groups upon the softness of polyurethane foams. For example, one approach is to reduce the polyol functionality while increasing the polymer chain length of the polyol. Polypropylene oxide/polyethylene oxide copolymer triols with molecular weights varying from 2000 to 6000 are blended with diols of similar structure. In high water blown formulations, the softening effect provided by these diol/triol blends is limited if the overall functionality is not greatly reduced and the molecular weight is significantly increased. Such changes in the structure of the polyol blends result in a decrease of the polyol reactivity which has to be compensated by large additions of ethylene oxide. Then, the final polyols become difficult to process and yield foams with poor static fatigue properties and significantly reduced resistance to hydrolysis.

An example of this first approach is seen in U.S. Pat. No. 3,857,800 which describes flexible polyurethane foams made by foaming a reaction mixture containing a polyol, an organic polyisocyanate and a blowing agent, which may be water, which would otherwise produce a closed cell foam which would shrink after its formation wherein the foamable reaction mixture is modified by including therein a subsidiary polyol which is different from the primary polyol and which has a molecular weight of about 500 to 3500 and contains at least 40% by weight oxyethylene groups with at least some of them in a non-terminal position, the amount of subsidiary polyol being not more than 50% by weight of the total polyol in the reaction mixture. The subsidiary polyol may be a polyethylene ether glycol.

Related to this patent is U.S. Pat. No. 3,943,075 which discusses flame-resistant polyurethane foams obtained by reacting a tolylene diisocyanate (TDI) with a polyol in the presence of a substance which is normally effective for the polymerization of TDI and an anti-aging additive such as a halogenated aliphatic phosphate. A subsidiary polyol such as the one of the '800 patent may also be present. Companion U.S. Pat. No. 3,803,064 covers the processes for making the foams of the '075 patent. French Patent 2,095,362 is also related to this group of patents.

Additionally of interest with respect to this approach is U.S. Pat. No. 4,259,452. It relates to a method of producing flexible polyether polyurethane foams, which have a substantially skeletal reticulated structure. When the flexible foam is produced by reacting a polyhydroxyl compound with an organic polyisocyanate in the presence of a blowing agent by a one-shot process, a catalyst and other additives, a mixture of (a) poly(oxyethylene-oxypropylene)polyether polyol containing 51 to 98% by weight of ethylene oxide component and (b) poly(oxyethylene-oxypropylene)polyether polyol containing not less than 51% by weight of propylene oxide component is used as the polyhydroxyl compound.

A second approach is to reduce the excess urea groups by decreasing the isocyanate index of the all water blown formulations. With this method, using conventional poly propylene/poly ethylene oxide copolymer triols of molecular weight varying from 2000 to 6000, both the foaming process and the foam physical properties deteriorate rapidly when the isocyanate index drops below 103.

The low crosslink density of the foam at the early stage of polymerization yields weak cell structure and partial collapses. Increasing the catalyst and surfactant levels overcomes this lack of stability and yields a foam with closed cell structure and potential shrinkage. As a result, some of the major foam physical properties such as the tear resistance, the tensile, the elongation, are completely deteriorated, while the static fatigue values become marginal.

However, since neither of these approaches has proven to be satisfactory, it would be useful to devise an improved polyurethane composition employing only water as a blowing agent which would not have its properties degraded at all, and particularly in the manner of the prior approaches.

SUMMARY OF THE INVENTION

Accordingly, it is an object of the present invention to provide a polyurethane composition that requires no additional blowing agent other than water to generate carbon dioxide thereby avoiding the use of CFCs.

It is yet another object of the invention to provide a novel polyurethane composition that is otherwise similar to conventional polyurethane compositions in all respects.

It is another object of the present invention to provide a polyurethane composition that can be readily produced with available polyurethane technology.

In carrying out these and other objects of the invention, there is provided, in one form, a polyurethane foam composition that is the reaction product of a polyol blend with a polyisocyanate in the presence of a polyurethane catalyst, and further in the presence of a blowing agent of only water in the absence of a halocarbon. The polyol blend comprises a relatively low molecular weight polyethylene glycol and a relatively higher molecular weight polyalkylene oxide triol.

DETAILED DESCRIPTION OF THE INVENTION

It has been discovered that special blends of polyols enable the production of all water blown flexible polyurethane foams, and in particular to obtain substantially soft foams of densities varying from 1.15 to 1.7 pcf, yet retaining excellent physical properties. It has been discovered that the softening effect caused by the reduction of the isocyanate index can be achieved without penalizing the foaming process, which may undesirably cause excessively open or tight foams, and the physical properties, such as reductions in strength, static fatigue and resistance to hydrolysis caused by the first approach described above. The discovery involves the addition of small amounts of short-chain, relatively low molecular weight, reactive polyethylene glycols to the polypropylene oxide/polyethylene oxide copolymer triols to give a polyol blend.

The short chain extension resulting from a low molecular weight difunctional product interferes with the separation of the polyurea hard segments and reduces any orientation of the polyether chain. In addition, a reactive short chain extender will provide at an earlier stage a controlled crosslink density of the foam to maintain its stability without promoting a closed cell structure. Consequently, it will also offer a wide foam processing latitude.

More specifically, the relatively low molecular weight polyethylene glycol ranges from about 200 to 600 molecular weight. It may have the structure represented by the formula $HO-(CH_2CH_2O)_x-H$, where $x$ ranges from about 4 to 13. The use of these materials allow polyurethane foams to be prepared at lower than normal TDI indexes. The lower TDI index occurs without disadvantage because the formulation of this invention possesses early cross-linking and early exotherm. In one embodiment, the low molecular weight polyethylene glycol is less than 50% of the polyol blend, where the relatively high molecular weight polyalkylene oxide polyol is greater than 50% of the polyol blend. It was surprising to discover that only small amounts of these lower molecular weight materials need be used. For example, only about 2 to about 10 pbw of the polyol, based on the total polyurethane formulation, need be used, which is the equivalent of about 0.9 to 9% of the formulation. Preferably, the proportion of lower molecular weight polyol is about 4 to about 8 pbw of the formulation.

High resiliency (HR) foams may also be made using the polyol blends of the present invention. It is also expected that the foams of the invention may be modified in other ways, such as to achieve greater fire retardancy, without detriment and within the scope of the invention.

In accordance with this invention, the remaining polyurethane foam components are expected to be conventional, indicating that the invention is compatible with standard formulations. For example, a variety of relatively high molecular weight polyether and/or polyester polyols are expected to be useful together with the low molecular weight polyethylene glycol in the polyol blends for the polyurethane compositions of this invention. These polyols include, but are not necessarily limited to ethylene oxide (EO) capped polyols and polyols not capped with EO, as well as propylene oxide (PO) and/or butylene oxide containing polyols. The polyols may contain blocks or random distributions of these various alkylene oxides added to suitable initiators. In one aspect, the polyol preferably has a molecular weight of from about 2000 to 10,000, and more preferably from about 3000 to 8000, and is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP), $\alpha$-methylglucoside, $\beta$-methylglucoside, or other methylglucoside, resins of phenol, aniline and mixed phenol aniline, such as methylenedianiline or bisphenol A, Mannich condensates and mixtures thereof, for example. The polyol may be made by alkoxylating the initiator with a desired number of moles of an alkylene oxide. Preferably, the alkylene oxide has two to four carbon atoms, and is thus, EO, PO, butylene oxide or mixtures thereof, as noted. The alkylene oxides may be mixed upon addition, or may be added to the polyol initiator chain separately to form blocks or caps. In one aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein. Alternatively, various polymer polyols may also be employed as completely replacing or in conjunction with suitable, enumerated polyol components. Preferably, the relatively high molecular weight polyalkylene triol is a mixed polypropylene oxide/polyethylene oxide copolymer triol.

A catalyst is typically employed in preparing polyurethane foams in the conventional manner. Such catalysts may include one or more of the following:

(a) Tertiary amines such as trimethylamine; triethylamine; N-methylmorpholine; N-ethylmorpholine; N,N- dimethylbenzylamine; N,N-dimethylethanolamine; N,N,N',N'-tetramethyl-1,4-butanediamine; N,N-dimethylpiperazine; 1,4-diazobicyclo[2.2.2]octane; triethylenediamine and the like;

(b) Tertiary phosphines such as trialkylphosphines; dialkylbenzylphosphines, and the like;

(c) Strong bases, such as alkali and alkaline earth metal hydroxides; alkoxides; and phenoxides;

(d) Acidic metal salts of strong acids, such as ferric chloride; stannic chloride; stannous chloride; antimony trichloride; bismuth nitrate and chloride; and the like;

(e) Chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bis-acetylacetonealkylenediamine; salicyclaldehydeimine; and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals, such as $Ti(OR)_4$; $Sn(OR)_4$; $Al(OR)_3$; and the like, wherein R is alkyl or aryl, and the reaction products of alcoholates with carboxylic acids, $\beta$-diketones, and 2-(N,N-dialkylamino)alcohols;

(g) Salts of organic acids with a variety of metals, such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 pbw percent, based on 100 pbw of the polyol. More often, the amount of the catalyst used is about 0.2 to about 2.0 pbw.

The polyol blend for the polyurethane composition is reacted in the presence of one or more of the above catalysts with a polyisocyanate according to conventional procedures. The polyisocyanate used may be any aromatic or aliphatic polyisocyanate, such as toluene diisocyanates (TDIs); polymeric isocyanates and aliphatic diisocyanates. Typical aromatic polyisocyanates include, but are not limited to, m-phenylene diisocyanate; p-phenylene diisocyanate; polymethylene polyphenyl-isocyanate; 2,4-toluene diisocyanate; 2,6-toluene diisocyanate; dianisidine diisocyanate; bitolylene diisocyanate; naphthalene-1,4-diisocyanate; diphenylene-4,4'-diisocyanate; aliphatic-aromatic diisocyanates, such as xylylene-1,4-diisocyanate; xylylene-1,2-diisocyanate; xylylene-1,3-diisocyanate; bis(4-isocyanatophenyl)methane; bis(3-methyl-4-isocyanatophenyl)methane; and 4,4'-diphenylpropane diisocyanate. Suitable aliphatic diisocyanates would include isophorone diisocyanate; hexamethylene diisocyanate; and methylene-bis-cyclohexylisocyanate. Toluene diisocyanates are preferred, in one aspect of the invention.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts.

Foaming is carried out in the presence of water which reacts with the isocyanate to produce carbon dioxide that acts as the blowing agent. The water is normally used in amounts of 0.5 to 7 parts by weight, preferably, 1.5 to 6.5 pbw based on 100 pbw of the polyol present. No other organic blowing agents are used along with the water in this invention. Auxiliary blowing agents such as the chlorofluorocarbons or methylene chloride are not necessary or desired. Additives to regulate the cell size and the cell structure, for example, silicone surfactants such as dimethylpolysiloxanes, may also be added to the foaming mixture however. Fillers, dyes or plasticizers of known types may also be used, of course. These and other additives are well known to those skilled in the art.

The invention has been demonstrated in the laboratory. The following are examples of the practice of incorporating low molecular weight polyethylene glycols into high molecular weight polypropylene oxide/-polyethylene oxide triols. All results were generated from polyurethane resin foams produced on a Maxfoam laboratory scale machine and measured according to ASTM D3574.

TABLE I

Polyurethane Foams of Density Grade: 1.2 pcf

| | Example No. | | | | | | | | |
|---|---|---|---|---|---|---|---|---|---|
| | 1 | 2 | 3 | 4 | 5 | 6 | 7 | 8 | 9 |
| Thanol ® F-3520 | 92 | 100 | 92 | 100 | 92 | 96 | 100 | 92 | 100 |
| PEG 200 | 0 | 0 | 0 | 0 | 0 | 4 | 0 | 0 | 0 |
| PEG 400 | 8 | 0 | 8 | 0 | 8 | 0 | 0 | 8 | 0 |
| Water | 5.5 | 5.5 | 5.5 | 5.5 | 5.5 | 5.5 | 5.5 | 5.5 | 5.5 |
| Dabco 33LV | 0.26 | 0.26 | 0.26 | 0.26 | 0.26 | 0.26 | 0.26 | 0.26 | 0.26 |
| Surfactant L6202 | 1.4 | 1.4 | 1.6 | 1.6 | 1.5 | 1.4 | 1.5 | 1.5 | 1.5 |
| Dabco T-10 | 0.20 | 0.52 | 0.20 | 0.52 | 0.20 | 0.18 | 0.46 | 0.19 | 0.46 |
| Blowing Agent | 0 | 0 | 0 | 0 | 0 | 0 | 0 | 0 | 0 |
| TDI Index | 95 | 95 | 98 | 98 | 100 | 100 | 100 | 103 | 103 |
| Density, pcf | 1.19 | 1.19 | 1.17 | 1.15 | 1.16 | 1.20 | 1.16 | 1.16 | 1.15 |
| Air flow, cfm | 6.6 | 4.9 | 6.8 | 5.1 | 7.2 | 6.3 | 5.0 | 6.9 | 4.9 |
| IFD, lbs | | | | | | | | | |
| 25% | 14.5 | 12.5 | 15.5 | 16.1 | 17.2 | 23.9 | 23.4 | 21.7 | 21.7 |
| 65% | 33.0 | 28.1 | 35.2 | 36.6 | 39 | 51.4 | 49.4 | 48 | 47.6 |
| Sag factor | 2.27 | 2.24 | 2.27 | 2.27 | 2.27 | 2.15 | 2.11 | 2.21 | 2.19 |
| Tensile, psi | 10.5 | 3.3 | 10.1 | 8.1 | 10.5 | 16.6 | 13.4 | 15.3 | 13.7 |
| Tear, pli | 2.7 | 0.2 | 2.7 | 0.7 | 2.7 | 3.6 | 2.9 | 3.5 | 3.1 |
| Elongation, % | 278 | 66 | 254 | 178 | 262 | 388 | 284 | 324 | 264 |
| 50% Comp. Set, % | 13.0 | 7.8 | 14.5 | 7.6 | 11.8 | 7.1 | 10.3 | 8.5 | 6.4 |
| 90% Comp. Set, % | 15.1 | 11.7 | 13.5 | 8.6 | 11.4 | 8.6 | 8.4 | 10 | 7.4 |
| Static fatigue | 31.0 | 76 | 29 | 25.5 | 27.3 | 31.4 | 16.7 | 26.3 | 17.1 |

TABLE I-continued

| | Polyurethane Foams of Density Grade: 1.2 pcf | | | | | | | | |
|---|---|---|---|---|---|---|---|---|---|
| | Example No. | | | | | | | | |
| | 1 | 2 | 3 | 4 | 5 | 6 | 7 | 8 | 9 |
| Ball rebound | 44 | 36 | 42 | 36 | 41 | 36 | 40 | 40 | 41 |

TABLE II

| | Polyurethane Foams of Density Grade: 1.3 pcf | | | | | | | | | |
|---|---|---|---|---|---|---|---|---|---|---|
| | Example No. | | | | | | | | | |
| | 10 | 11 | 12 | 13 | 14 | 15 | 16 | 17 | 18 | 19 |
| Thanol ® F-3520 | 92 | 100 | 92 | 100 | 92 | 96 | 100 | 92 | 96 | 100 |
| PEG 200 | 0 | 0 | 0 | 0 | 0 | 4 | 0 | 0 | 4 | 0 |
| PEG 400 | 8 | 0 | 8 | 0 | 8 | 0 | 0 | 8 | 0 | 0 |
| Water | 5.0 | 5.0 | 5.0 | 5.0 | 5.0 | 5.0 | 5.0 | 5.0 | 5.0 | 5.0 |
| Dabco T-10 | 0.28 | 0.28 | 0.28 | 0.28 | 0.28 | 0.28 | 0.28 | 0.28 | 0.28 | 0.28 |
| Surfactant L6202 | 1.3 | 1.3 | 1.3 | 1.3 | 1.3 | 1.3 | 1.3 | 1.3 | 1.4 | 1.3 |
| Dabco T-10 | 0.22 | 0.52 | 0.22 | 0.50 | 0.20 | 0.18 | 0.48 | 0.20 | 0.18 | 0.46 |
| Blowing Agent | 0 | 0 | 0 | 0 | 0 | 0 | 0 | 0 | 0 | 0 |
| TDI Index | 95 | 95 | 98 | 98 | 100 | 100 | 100 | 103 | 103 | 103 |
| Density, pcf | 1.29 | 1.26 | 1.29 | 1.25 | 1.31 | 1.30 | 1.23 | 1.28 | 1.26 | 1.25 |
| Air flow, cfm | 6.3 | 4.7 | 6.4 | 5.2 | 6.6 | 4.4 | 5.3 | 6.7 | 6.0 | 5.6 |
| IFD, lbs | | | | | | | | | | |
| 25% | 15.7 | 13.4 | 17.0 | 15.9 | 17.9 | 19.5 | 21.7 | 23.5 | 21.8 | 23.5 |
| 65% | 34.7 | 31.3 | 37.3 | 35.1 | 41.0 | 42.7 | 46.8 | 50.5 | 50.0 | 49.7 |
| Sag factor | 2.21 | 2.33 | 2.19 | 2.20 | 2.29 | 2.19 | 2.16 | 2.15 | 2.29 | 2.11 |
| Tensile, psi | 12.1 | 2.3 | 12.0 | 5.1 | 13.9 | 13.7 | 12.8 | 17.4 | 17.2 | 14.2 |
| Tear, pli | 2.7 | 0.3 | 3.2 | 0.8 | 3.5 | 3.6 | 2.3 | 3.6 | 3.2 | 2.7 |
| Elongation, % | 322 | 58 | 310 | 88 | 316 | 342 | 300 | 326 | 300 | 276 |
| 50% Comp. Set, % | 8.4 | 8.7 | 10.4 | 10.2 | 8.5 | 8.8 | 4.9 | 6.6 | 6.7 | 5.0 |
| 90% Comp. Set, % | 8.5 | 10.9 | 12.0 | 10.0 | 8.3 | 12.9 | 6.9 | 7.4 | 12.0 | 5.7 |
| Static fatigue | 28.7 | 42 | 28.2 | 28.9 | 27.4 | 31.8 | 24.9 | 23.4 | — | 24.3 |
| Ball rebound | 45 | 41 | 44 | 41 | 43 | — | 40 | 44 | — | 40 |

TABLE III

| | Polyurethane Foams of Density Grade: 1.4 pcf | | | | | | | | | |
|---|---|---|---|---|---|---|---|---|---|---|
| | Example No. | | | | | | | | | |
| | 20 | 21 | 22 | 23 | 24 | 25 | 26 | 27 | 28 | 29 |
| Thanol ® F-3520 | 92 | 96 | 100 | 92 | 100 | 92 | 96 | 100 | 92 | 100 |
| PEG 200 | 0 | 4 | 0 | 0 | 0 | 0 | 4 | 0 | 0 | 0 |
| PEG 400 | 8 | 0 | 0 | 8 | 0 | 8 | 0 | 0 | 8 | 0 |
| Water | 4.5 | 4.8 | 4.5 | 4.5 | 4.5 | 4.5 | 4.5 | 4.5 | 4.5 | 4.5 |
| Dabco 33LV | 0.30 | 0.30 | 0.30 | 0.30 | 0.30 | 0.30 | 0.30 | 0.30 | 0.30 | 0.30 |
| Surfactant L6202 | 1.2 | 1.2 | 1.2 | 1.2 | 1.2 | 1.2 | 1.2 | 1.2 | 1.2 | 1.2 |
| Dabco T-10 | 0.24 | 0.18 | 0.54 | 0.24 | 0.52 | 0.22 | 0.18 | 0.50 | 0.22 | 0.48 |
| Blowing Agent | 0 | 0 | 0 | 0 | 0 | 0 | 0 | 0 | 0 | 0 |
| TDI Index | 95 | 95 | 95 | 98 | 98 | 100 | 100 | 100 | 103 | 103 |
| Density, pcf | 1.40 | 1.35 | 1.40 | 1.39 | 1.39 | 1.39 | 1.36 | 1.39 | 1.39 | 1.35 |
| Air flow, cfm | 5.8 | 4.6 | 4.2 | 6.1 | 4.5 | 6.4 | 5.1 | 4.6 | 6.6 | 4.5 |
| IFD, lbs | | | | | | | | | | |
| 25% | 16.3 | 18.8 | 15.4 | 16.7 | 18.7 | 18.6 | 18.3 | 20.4 | 23.1 | 23.3 |
| 65% | 36.5 | 40.9 | 34.2 | 36.5 | 39.9 | 39.1 | 39.5 | 42.2 | 49.3 | 51.6 |
| Sag factor | 2.24 | 2.17 | 2.22 | 2.19 | 2.13 | 2.10 | 2.16 | 2.07 | 2.13 | 2.2 |
| Tensile, psi | 11.4 | 11.9 | 4.1 | 12.5 | 7.2 | 13.6 | 9.8 | 9.3 | 17.6 | 15.1 |
| Tear, pli | 2.8 | 2.7 | 0.4 | 2.5 | 1.4 | 3.0 | 2.1 | 2.2 | 3.6 | 3.3 |
| Elongation, % | 326 | 360 | 78 | 324 | 148 | 356 | 200 | 234 | 354 | 346 |
| 50% Comp. Set, % | 11.3 | 12.9 | 6.1 | 11.7 | 5.4 | 8.9 | 9.4 | 5.2 | 5.8 | 5.0 |
| 90% Comp. Set, % | 21.9 | 22.6 | 9.0 | 23.8 | 8.2 | 13.9 | 13.5 | 7.9 | 6.2 | 5.7 |
| Static fatigue | 29.4 | 32.4 | 31.8 | 29.9 | 31.6 | 28 | — | 29 | 26 | 21 |
| Ball rebound | 43 | 35 | 41 | 42 | 42 | 43 | — | 43 | 42 | 42 |

As shown in Tables I-III, the hardness values (IFD 25%) are reduced by about 40 percent in the low isocyanate index (95-98 vs. 100-103) all water blown polyethylene ether glycol formulations, while the strength and static fatigue properties remain excellent. Thus, the formulations of the invention provide good foams without the use of CFCs and using only water to generate the blowing agent, without a loss in properties, such as tensile elongation, etc. By adding the relatively low molecular weight glycols, the isocyanate index may be dropped while retaining foam physical properties.

Many modifications may be made in the polyurethane foams of this invention and their method of production without departing from the spirit and scope of the invention, which is defined only in the appended claims. For example, one skilled in the art could adjust the temperature, pressure, reactants, proportions and modes of additions within the parameters set forth to provide polyurethane foams with particularly advantageous properties. Other polyethylene glycols besides those specifically set forth may also be used within the claimed spirit and scope of the invention. It will also be appreciated that although only one relatively low molecular weight polyethylene glycol is used in the illustrative examples, that it is anticipated that more than one glycol may be employed simultaneously.

| GLOSSARY | |
|---|---|
| Dabco 33LV | A product of Air Products and Chemicals Inc., a solution of triethylenediamine in dipropylene glycol. |
| Dabco T-10 | A product of Air Products and Chemicals Inc., di-(2-ethylhexyl)phthalate/stannous alkyl hexoate in a ratio of 50/50. |
| PEG 200 | Polyethylene glycol with a molecular weight of about 200. |
| PEG 400 | Polyethylene glycol with a molecular weight of about 400. |
| Surfactant L6202 | A product of Union Carbide Corporation, polyalkyleneoxidemethylsilioxane copolymers. |
| Thanol ® F-3520 polyol | A glycerin initiated polyether of propylene oxide and containing about 13% ethylene oxide, with a hydroxyl number of 48 and containing essentially secondary hydroxyl groups, made by ARCO Chemical Company. |

We claim:

1. A flexible polyurethane foam composition comprising the reaction product of a polyol blend with a polyisocyanate in the presence of a polyurethane catalyst, and further in the presence of a blowing agent comprising water in the absence of a chlorofluorocarbon (CFC), where the polyol blend comprises a relatively low molecular weight polyethylene glycol and a relatively higher molecular weight polyalkylene oxide triol containing essentially secondary hydroxyl groups.

2. The flexible polyurethane foam composition of claim 1 where the low molecular weight polyethylene glycol is less than 50% of the polyol blend and the relatively higher molecular weight polyalkylene oxide triol is greater than 50% of the polyol blend.

3. The flexible polyurethane foam composition of claim 1 where the low molecular weight polyethylene glycol comprises from about 2 to about 10 pbw of the polyol, based on the total polyurethane foam composition.

4. The flexible polyurethane foam composition of claim 1 where the low molecular weight polyethylene glycol comprises from about 4 to about 8 pbw of the polyol, based on the total polyurethane foam composition.

5. The flexible polyurethane foam composition of claim 1 where the low molecular weight polyethylene glycol has a molecular weight range between about 200 and about 600.

6. The flexible polyurethane foam composition of claim 1 where the relatively high molecular weight polyalkylene triol is a mixed polypropylene oxide/polyethylene oxide copolymer triol.

7. The flexible polyurethane foam composition of claim 1 where the relatively higher molecular weight polyalkylene oxide triol has a molecular weight of at least 2000.

8. A flexible polyurethane foam composition comprising the reaction product of a polyol blend with a polyisocyanate in the presence of a polyurethane catalyst, and further in the presence of a blowing agent comprising water in the absence of a chlorofluorocarbon (CFC), where the polyol blend comprises less than 50% of a relatively low molecular weight polyethylene glycol and greater than 50% of a relatively higher molecular weight polyalkylene oxide triol containing essentially secondary hydroxyl groups, and where the low molecular weight polyethylene glycol has a molecular weight range between about 200 and about 600.

9. The flexible polyurethane foam composition of claim 8 where the low molecular weight polyethylene glycol comprises from about 2 to about 10 pbw of the polyol, based on the total polyurethane foam composition.

10. The flexible polyurethane foam composition of claim 8 where the relatively high molecular weight polyalkylene triol is a mixed polypropylene oxide/polyethylene oxide copolymer triol.

11. The flexible polyurethane foam composition of claim 8 where the relatively higher molecular weight polyalkylene oxide triol has a molecular weight of at least 2000.

12. A method for producing flexible polyurethane foam compositions comprising the steps of:
producing a polyol blend by mixing a relatively low molecular weight polyethylene glycol with a relatively higher molecular weight polyalkylene oxide triol containing essentially secondary hydroxyl groups; and
reacting the polyol blend with a polyisocyanate in the presence of a polyurethane catalyst, and further in the presence of a blowing agent comprising water in the absence of a chlorofluorocarbon (CFC).

13. The method of claim 12 where the low molecular weight polyethylene glycol is less than 50% of the polyol blend and the relatively higher molecular weight polyalkylene oxide triol is greater than 50% of the polyol blend.

14. The method of claim 12 where the low molecular weight polyethylene glycol comprises from about 2 to about 10 pbw of the polyol, based on the total polyurethane foam composition.

15. The method of claim 12 where the low molecular weight polyethylene glycol comprises from about 4 to about 8 pbw of the polyol, based on the total polyurethane foam composition.

16. The method of claim 12 where the low molecular weight polyethylene glycol has a molecular weight range between about 200 and about 600.

17. The method of claim 12 where the relatively high molecular weight polyalkylene triol is a mixed polypropylene oxide/polyethylene oxide copolymer triol.

18. The method of claim 12 where the relatively higher molecular weight polyalkylene oxide triol has a molecular weight of at least 2000.

19. A method for producing flexible polyurethane foam compositions comprising the steps of:
producing a polyol blend by mixing a relatively low molecular weight polyethylene glycol with a relatively higher molecular weight polyalkylene oxide triol containing essentially secondary hydroxyl groups, where the polyol blend comprises less than 50% of the relatively low molecular weight polyethylene glycol and greater than 50% of the relatively higher molecular weight oxide triol, and where the low molecular weight polyethylene glycol has a molecular weight range between about 200 and about 600; and
reacting the polyol blend with a polyisocyanate in the presence of a polyurethane catalyst, and further in the presence of a blowing agent comprising water in the absence of a chlorofluorocarbon (CFC).

20. The method of claim 19 where the low molecular weight polyethylene glycol comprises from about 2 to about 10 pbw of the polyol, based on the total polyurethane foam composition.

21. The method of claim 19 where the relatively high molecular weight polyalkylene triol is a mixed polypropylene oxide/polyethylene oxide copolymer triol.

22. The method of claim 19 where the relatively higher molecular weight polyalkylene oxide triol has a molecular weight of at least 2000.

23. The polyurethane foam composition of claim 1 where the polyisocyanate is toluene diisocyanate (TDI).

24. The method of claim 12 where the polyisocyanate is toluene diisocyanate (TDI).

25. A soft, halocarbon-free flexible polyurethane foam composition comprising the reaction product of a polyol blend with a polyisocyanate in the presence of a polyurethane catalyst, and further in the presence of a blowing agent comprising water in the absence of a chlorofluorocarbon (CFC),
   where the polyol blend comprises a relatively low molecular weight polyethylene glycol and a relatively higher molecular weight polyalkylene oxide triol containing essentially secondary hydroxyl groups,
   where the composition has an isocyanate index which is less than 100; and
   where the resultant halocarbon-free polyurethane foam is softer without adversely affecting the strength and static fatigue properties of the polyurethane foam.

26. The soft, halocarbon-free polyurethane foam composition of claim 25 where the resultant polyurethane foam has a density of at least 1.15 pounds per cubic foot (pcf).

27. The soft, halocarbon-free flexible polyurethane foam composition of claim 25
   where the polyol blend comprises less than 50% of the relatively low molecular weight polyethylene glycol and greater than 50% of the relatively higher molecular weight polyalkylene oxide triol;
   where the low molecular weight polyethylene glycol has a molecular weight range between about 200 and about 600;
   where the resultant polyurethane foam has a density of at least 1.15 pounds per cubic foot (pcf); and
   where the water is present in an amount from 0.5 to 7 parts by weight of the total polyol.

28. The soft, halocarbon-free polyurethane foam composition of claim 27 where the polyisocyanate is toluene diisocyanate (TDI).

29. A method for producing a soft, halocarbon-free flexible polyurethane foam composition comprising the steps of:
   producing a polyol blend by mixing a relatively low molecular weight polyethylene glycol and a relatively higher molecular weight polyalkylene oxide triol containing essentially secondary hydroxyl groups; and
   reacting the polyol blend with a polyisocyanate in the presence of a polyurethane catalyst, and further in the presence of a blowing agent comprising water in the absence of a chlorofluorocarbon (CFC), where the composition has an isocyanate index which is less than 100; and
   where the resultant halocarbon-free polyurethane foam is softer without adversely affecting the strength and static fatigue properties of the polyurethane foam.

30. The method of claim 29 where the resultant polyurethane foam has a density of at least 1.15 pounds per cubic foot (pcf).

31. The method of claim 29
   where the polyol blend comprises less than 50% of the relatively low molecular weight polyethylene glycol and greater than 50% of the relatively higher molecular weight polyalkylene oxide triol;
   where the low molecular weight polyethylene glycol has a molecular weight range between about 200 and about 60;
   where the resultant polyurethane foam has a density of at least 1.15 pounds per cubic foot (pcf); and
   where the water is present in an amount from 0.5 to 7 parts by weight of the total polyol.

32. The method of claim 29 where the polyisocyanate is toluene diisocyanate (TDI).

* * * * *